United States Patent
Albou

(10) Patent No.: US 6,280,067 B1
(45) Date of Patent: Aug. 28, 2001

(54) MOTOR VEHICLE LIGHTING SYSTEM WITH A SIGNALING FUNCTION FOR USE IN DAYLIGHT

(75) Inventor: Pierre Albou, Paris (FR)

(73) Assignee: Valeo Vision (FR)

( * ) Notice: Subject to any disclaimer, the term of this patent is extended or adjusted under 35 U.S.C. 154(b) by 0 days.

(21) Appl. No.: 09/489,397

(22) Filed: Jan. 21, 2000

(51) Int. Cl.$^7$ .................................................. B60Q 1/00
(52) U.S. Cl. ..................... 362/459; 362/512; 362/539; 362/282; 362/293
(58) Field of Search ...................... 362/459, 512, 362/513, 538, 539, 279, 282–284, 293

(56) References Cited

U.S. PATENT DOCUMENTS

| | | | |
|---|---|---|---|
| 4,684,819 | 8/1987 | Haag | 315/82 |
| 4,841,199 | 6/1989 | Irie | 315/83 |
| 5,718,505 | * 2/1998 | Daumueller et al. | 362/279 |
| 5,899,559 | * 5/1999 | Lachmayer et al. | 362/513 |

FOREIGN PATENT DOCUMENTS 0 428 360    5/1991   (EP) .

* cited by examiner

Primary Examiner—Sandra O'Shea
Assistant Examiner—Bertrand Zeade
(74) Attorney, Agent, or Firm—Morgan & Finnegan, LLP

(57) ABSTRACT

A motor vehicle lighting system comprises a lighting switch having a daylight signaling position and two night driving illumination positions, with a running light (or headlight) having a discharge lamp cooperating with a reflector to produce a night driving beam essentially without any cut-off. The running light has a discharge lamp cooperating with a reflector to produce a night driving beam which essentially has no cut-off. The system includes a means such as an absorbent element which, when the lighting switch is put in its daylight signaling position, diverts a fraction of the light intensity of the emitted beam so as to produce a beam of reduced intensity as compared with the same lamp powered under the same conditions.

17 Claims, 3 Drawing Sheets

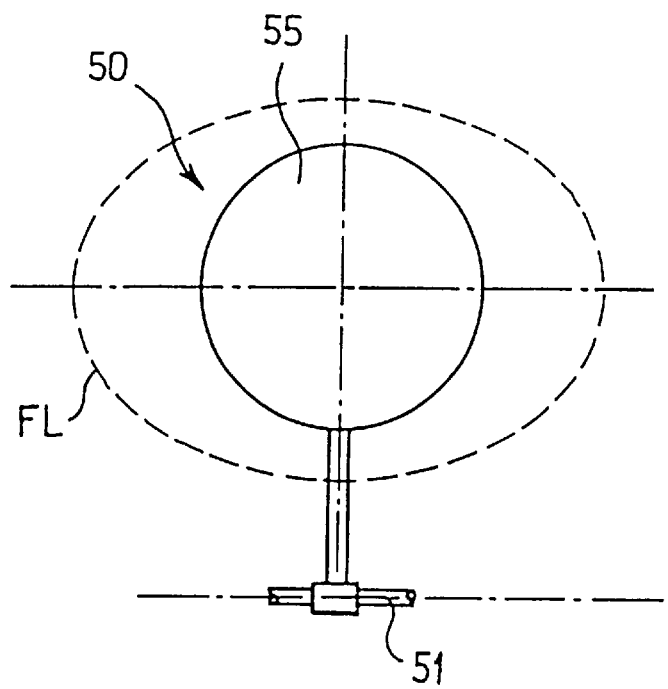
FIG_2
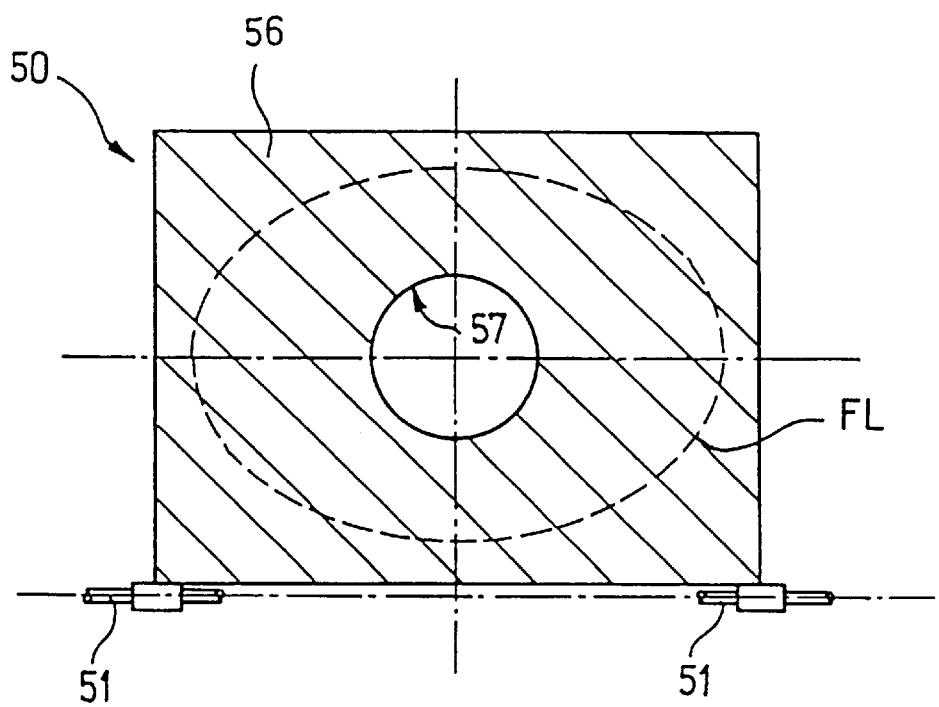
FIG_3

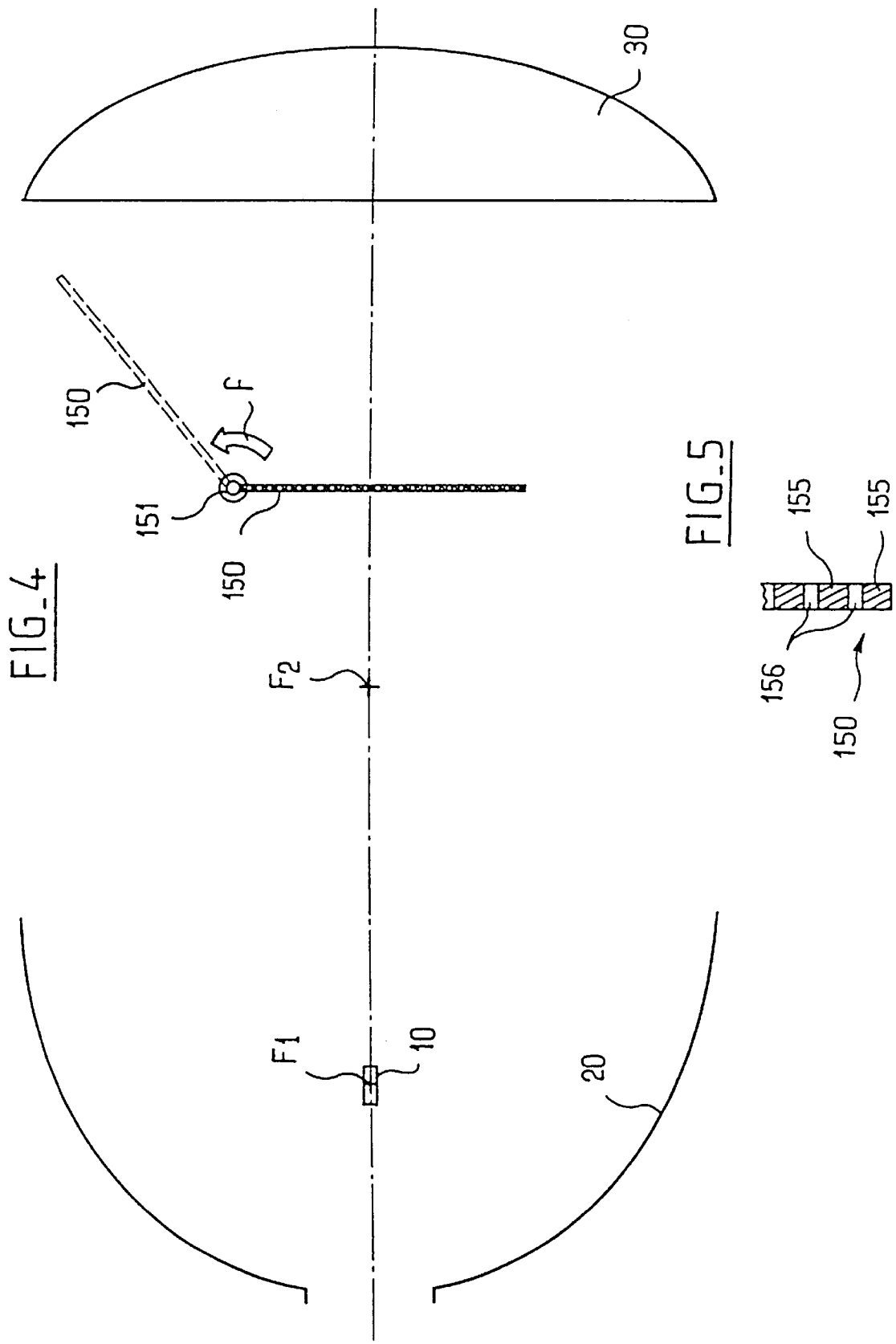

MOTOR VEHICLE LIGHTING SYSTEM WITH A SIGNALING FUNCTION FOR USE IN DAYLIGHT

FIELD OF THE INVENTION

The present invention is related in general terms to motor vehicle lighting systems, such lighting systems including at least one running light, that is to say a light (for example a headlight) which is intended to be used at least when the vehicle is traveling.

BACKGROUND OF THE INVENTION

Conventionally, a motor vehicle has to be capable of emitting, selectively, a so-called dipped beam which is generally defined by a cut-off line so as to avoid dazzling the drivers of oncoming vehicles, and a so-called main beam for illuminating the road well ahead of the driver of the vehicle. These functions are provided by means of either one or two pairs of headlights.

The headlights are generally illuminated at night and extinguished in daylight. However, there is today a tendency to regard it as being desirable to have the headlights lit in daylight, not in order to illuminate the driver's field of vision, but rather in order to provide a strong signaling or indicating function, especially for warning pedestrians, but without any inconvenience or detriment to the observer.

This function is commonly referred to as that of a "day running light" or DRL, and is known at the present time in the context of headlights with filament lamps. In order to give the required reduced light intensity to headlight driving beams for use in daylight, such as to make them capable of fulfilling this latter function, it is also known to energise the filament lamps of such headlights at a lower voltage, which is typically only a few volts, than their nominal supply voltage which is usually about 13.5 volts.

In addition, when a headlight is used in daylight driving in its dipped mode, which may involve a reduction in the supply voltage of its filament lamp, then this daylight use becomes added to its night time use. The light is used in the dipped mode far more than in its main beam mode, having regard in particular to the substantial worldwide increase in road traffic. As a result, the lamps (or the filaments in the case of twin function lamps) which provide the dipped beam function will fail much sooner than those lamps or filaments which are dedicated to the main beam function, having regard to their useful life which is, by nature, limited.

In addition, in the case where dipped beam headlights of the elliptical type are used in daylight driving, these headlights being of a kind which is well known as emitting an extremely limited quantity of light above the cut-off line, it is found that the required daylight signaling function is not at all satisfactory. In particular, in full sunlight, an observer who is a few meters or tens of meters in front of the vehicle is in danger of not even being able to see that the headlights are lit at all.

In parallel with the foregoing, we see today development of headlights which no longer have filament lamps, but which are instead equipped with discharge lamps, the latter being well known for their excellent light output for a given consumption of electrical power.

However, it is not possible to operate these headlights in the DRL mode. In this connection, if the supply voltage to the discharge lamp is reduced, then firstly the arc will tend to be subject to unexpected and badly controlled extinction, and secondly the useful life of the lamps is considerably reduced. Moreover, if in order to overcome this limitation it is decided to make use of headlights with discharge lamps with their normal light intensity, it is then found that dipped-beam lights give very imperfect signaling. The latter is too strong below the cut-off line but too weak above it, while at the same time the main beam headlights provide generally excessive intensity which is strongly dazzling even in full daylight.

DISCUSSION OF THE INVENTION

Having regard to the various limitations of the present state of the art discussed above, an object of the present invention is to provide a running light (such as a headlight) which is able to produce both a beam for night driving and a beam for driving in daylight, both of which are satisfactory, the light having a discharge lamp as its light source.

A further object of the invention is to avoid wearing out the lamp too quickly, even though it is used in the dipped beam mode very much more than in the main beam mode.

According to the invention, a motor vehicle headlight, comprising a discharge lamp cooperating with a reflector in order to produce an emitted light beam for night driving which essentially has no cut-off line, is characterised in that the headlight includes a means for selectively diverting a fraction of the light intensity of the beam in such a way as to generate, with the same lamp supplied with power under the same conditions, a reduced beam intensity appropriate to signaling in daylight.

The means for diverting the light is preferably an absorbent element for absorbing some of the light. This absorbent element may for example be a solid attenuating plate; alternatively it may be in the form of an opaque light trap interposed in a part of the emitted light beam, or an opaque plate having at least one through hole to allow the light to pass through. Again, the absorbent element may be in the form of a diaphragm; it may have a multiplicity of small through holes; and/or it may be in grid form, consisting of a grille or grating.

The running light may be of the elliptical type, in which case, according to a preferred feature of the invention, the light further includes a lens having a focus in the vicinity of a light concentration zone in which light is concentrated by the reflector, while the absorbent element is selectively positioned in such a way as to interrupt at least part of the emitted light beam after the latter has been reflected by the reflector.

The absorbent element may have an external contour such that it is interposed over the whole of the emitted light beam after the latter is reflected by the reflector.

The absorbent element may have an external contour such that it is interposed on a predetermined portion of the light beam after the latter has been reflected by the reflector.

The absorbent element may be adapted to be placed selectively in a direction which is essentially transverse with respect to the beam after the latter has been reflected by the reflector, at a distance from the said light concentration zone.

The absorbent element may be adapted to be positioned selectively between the said light concentration zone and an input face of the lens.

The absorbent element may be mounted pivotally in the headlight, for pivoting movement between a working position, in which it is interposed on the emitted light beam, and a retracted position spaced away from the said emitted light beam, being responsive to a controlled drive means.

The running light may have a reflector which itself produces the emitted light beam, while the absorbent element is selectively positioned in such a way as to be interposed on at least part of the emitted light beam between the light source and the reflector.

The absorbent element may be disposed around the light source, being then mounted on a support which is capable of being displaced parallel to an axis of the lamp, the said support being responsive to a controlled drive means.

The light beam for night driving is preferably a main beam.

Further features, objects and advantages of the present invention will appear more clearly on a reading of the following detailed description of some preferred embodiments of the invention, which are given by way of non-limiting example only and with reference to the accompanying drawings.

BRIEF DESCRIPTION OF THE DRAWINGS

FIG. 2 is a diagrammatic front view showing one embodiment of an attenuating or absorbent element in the running light of FIG. 1.

FIG. 3 is a diagrammatic front view of another version of the same element.

FIG. 4 is a diagrammatic view in vertical axial cross section of a running light in a second embodiment of the invention.

FIG. 5 is a view showing a part of FIG. 4 on a larger scale.

DESCRIPTION OF PREFERRED EMBODIMENTS OF THE INVENTION

Figure 1:
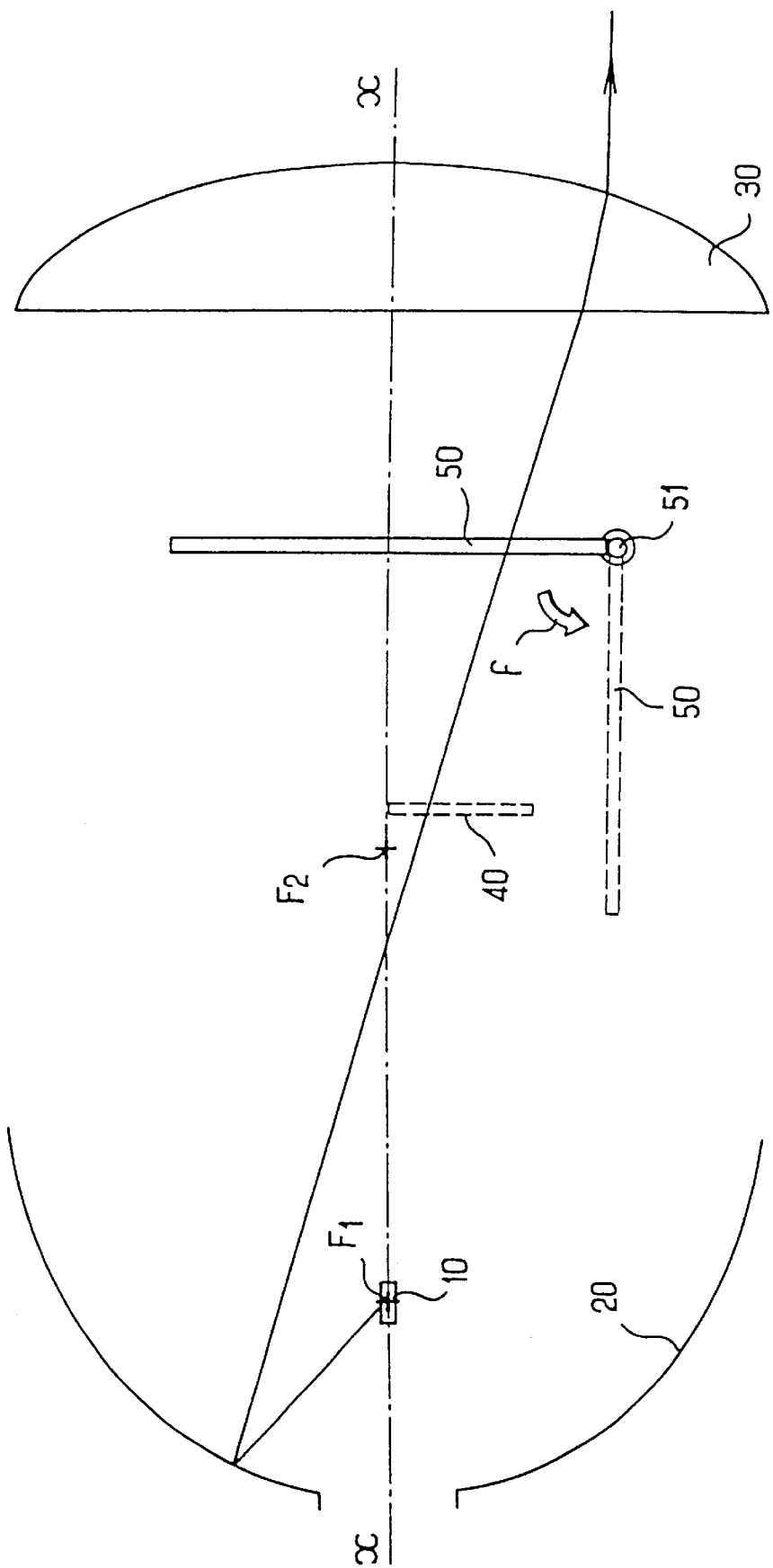
FIG. 1 is a diagrammatic view in vertical cross section, of a running light in a first embodiment of the invention.

Reference is first made to FIG. 1, which shows diagrammatically part of a motor vehicle running light, or headlight, of the elliptical kind, which comprises a light source 10, a reflector 20, and a lens 30. The light source 10 is the luminescent arc of a discharge lamp, while the reflector 20 is of the elliptical kind having a first focal zone F1 in which the light source 10 is placed, together with a second focal zone F2 in which the light radiation from the source 10 is concentrated after being reflected by the reflector 20. The lens 30 is of the planar-convex type, the focus of which is situated in the second focal zone F2, so as to project on the road the patch of light which is formed by the light source 10 and the reflector 20 in that zone.

It will be noted that in practice, the reflector 20 is not often in the form of a simple ellipsoid of revolution, and that is why, in the present Application, we refer to focal zones rather than to point foci.

An element 50 is interposed in at least a part of the path of the beam which is propagated in the reflector. The element 50 is such as to attenuate or to intercept, preferably by absorption, the light radiation passing through it. In this example the element 50 is placed on the path of the radiation downstream of the reflection on the reflector 20, and in this case between the second focal zone F2 and the lens 30.

The absorbent element, or attenuator, 50 may in practice take a number of different forms. Thus for example, in the embodiment shown in FIG. 1, it consists of a density, that is to say a material which allows the radiation to pass through it while attenuating it in given proportions without in any way modifying the path of the radiation. In particular, such an attenuator may consist of a plate, of glass or other suitable transparent material incorporating absorbent particles.

In another embodiment, and with reference now to FIG. 2, the attenuator 50 consists of a light trap, in the form, here, of an opaque plate 55 which is disposed in the middle of the radiation, but which has a cross section smaller than that of the beam of radiation at this point (the contour of which is indicated by the broken lines in FIG. 2 denoted FL), so that the surrounding or peripheral light bypasses the attenuator 50. In this example, the size of the light trap determines the proportion of light flux which is absorbed.

With reference now to FIG. 3, in yet another embodiment of the attenuator 50, the latter consists of a diaphragm, that is to say an opaque solid plate 56 in which a through hole 57 is formed. The fraction of the light radiation which is incident on the element 50 at the level of the through hole 57 is able to pass freely through the hole 57. The contours of the plate 56 are so chosen that it is interposed over the whole of the radiation FL, and the size of the hole 57 is chosen so that the desired quantity of light flux can pass through it.

The light trap, or the diaphragm as the case may be, are made for example of sheet metal so as to be able to withstand the high temperatures which are caused by absorption of the radiation emitted by the running light. The sheet metal is preferably coated with a matt black paint or the like, so as to minimise any parasitic reflections.

Whatever form it takes, the attenuating element 50 is mounted displaceably within the running light, so that it can be interposed selectively in the path of the emitted radiation, or retracted away from the latter so that all of the radiation can be allowed to pass. In the present example, the attenuating element 50 is pivoted about an axis 51, which is horizontal in this case and which is placed in the lower part of the light, so that it can adopt the working position shown in full lines in FIG. 1, and so that, if it is rotated as indicated by the arrow f, it can adopt the retracted position indicated in broken lines. The pivot axis 50 is naturally able to adopt any other orientation. Similarly, displacement of the attenuating element 50 in straight line or translational movement, or by a combination of rotation and translation, may be envisaged.

The movement of the attenuating element 50 is obtained, for example, by means of an electromagnet which is controlled from the fascia panel of the vehicle. A person skilled in the art may for this purpose draw on known arrangements of elliptical headlights with retractable light traps of a known type, in order to provide a facility for selectively giving a short range running light function (with the light trap in its deployed position), and a long range running light function with the light trap retracted.

It will be noted here that, where the attenuating element 50 consists of a light trap or a diaphragm, the working position is so chosen that it lies at a certain axial distance from the focus of the lens 30, in order to avoid the situation where the latter projects the image of the attenuating element outwards, which would render the beam totally non-homogeneous. In the present example, the attenuating element 50 is located substantially in a mid-course position, between the focal zone F2 and the input face of the lens 30.

In the retracted position of the element 50, the running light operates normally, emitting a long range headlight beam for night driving. By contrast, when the element 50 is in its working position, it attenuates the emitted radiation in the manner described above, without in any substantial way modifying its photometric distribution, so that the light produces a beam suitable for daylight driving, with an appropriate light intensity and therefore an appropriate field of illumination, which is very close to that of a long range headlight, so enabling the presence of the vehicle to be signaled at a wide variety of angles of observation from outside.

It will be noted here that the arrangement in which the attenuating element 50 is in the form of a light trap is of advantage in that, because the size of this element is then substantially smaller than in the case where it consists of a density or a diaphragm, the space that has to be provided to allow the attenuating element to move between its working position and its retracted position is also much smaller, and this facilitates incorporation of the assembly within the running light.

In addition, the long range headlight shown in FIG. 1 may in another version be a short range/long range headlight, in which case it includes a light trap 40 (indicated in broken lines), which is adapted to occupy, selectively, a working position situated in the focal zone F2, whereby to occult part of the light and form a cut-off dipped beam, and a retracted position in which it allows all of the light to pass so as to constitute the main beam.

Reference is now made to FIG. 4, which shows a second embodiment of the invention in which the elements 10, 20 and 30 are identical to those in FIG. 1 and therefore need not be described any further here. In the embodiment shown in FIG. 4, the absorbent element, indicated at 150 here, is opaque, and has a large number of through holes, which may or may not be spaced apart at regular intervals, and which may or may not be of uniform size. The ratio between the total surface area of these holes and the opaque surface of the element 150 determines the proportion of light flux which is allowed to pass through the absorbent element 150. FIG. 5 shows such holes at 156, separated by opaque zones 155.

Preferably, the absorbent element 50 is then made as a grid, in the form of a grille or grating, and is preferably made of metal so as to give it good resistance to heat. In addition, such a grille can be cooled more effectively than a light trap or diaphragm, because the air that can be displaced within the running light, by passing through the holes in the grating, thereby evacuates a large part of the heat.

Here again the attenuating element 150 is located at a distance from the focal zone F2, and preferably between the latter and the inlet face of the lens 30, so as to prevent the image of the grille or grating from being perceptible at distances from the vehicle at which daylight signaling of the presence of the latter has to be effective.

In the example described, the grid element 150 has contours such that it is interposed over the whole cross section of the radiated light. In another version, it is possible to combine this embodiment with, for example, those of FIGS. 2 and 3, by providing a light trap or diaphragm which intercepts only part of the radiation and which consists of the above mentioned grating or grille.

In the example shown in FIG. 4, the attenuating element 50 is mounted pivotally on an axis 51 which is situated in the upper part of the running light, and it pivots in the anti-clockwise direction so as to pass from its working position to its retracted position.

The present invention can of course also be applied to running lights in which the reflector itself produces the required beam without a lens being interposed. This is in particular the case with reflectors of the parabolic type, or those having "Complex Surfaces" (Trade Mark). In that case, the absorbent element 50 or 150 is interposed around the lamp, between the latter and the reflector, and is for example mounted on a sliding support which is displaceable parallel to the axis of the lamp.

In another version, the absorbent element 50 or 150, where it has opaque portions, may be not absorbent but reflective to radiation in the region of these opaque portions, with the surface of these opaque portions being so determined as to redirect the light towards an absorbent element which is situated outside the path of the radiation, and which is for example incorporated in the casing of the running light.

In all cases, it is preferably arranged that the attenuation produces is such that the daylight signaling beam has a general intensity which is of the order of from 3 to 15% of that of the main beam.

The present invention is of course in no way limited to the embodiments described above and/or shown in the drawings; a person skilled in this technical field will be able to apply to it any variation or modification within the spirit of the invention.

What is claimed is:

1. A motor vehicle lighting system comprising: a lighting switch defining a daylight signaling position and at least one night driving lighting positions; a running light comprising a reflector, a lens, and a discharge lamp juxtaposed to the reflector for cooperation therewith, for generating a lighting beam for night driving from which any cut-off is essentially absent; and means operatively coupled with the lighting switch and positioned between the lens and the reflector such that the light diverting means is pivotable at least 90 degrees for selectively interposing the light diverting means in the path of the light beam for diverting a fraction of light intensity of the beam in response to the putting of the switch into its daylight signaling position, in order to reduce the intensity of light in the beam produced by the same lamp energized under the same conditions and for pivotally retracting the light diverting means away from the path so that all of the light beam is allowed to pass through the lens.

2. A system according to claim 1, wherein the light diverting means comprise an absorbent element for absorbing part of the emitted light.

3. A system according to claim 2, wherein the absorbent element is a solid attenuating plate.

4. A system according to claim 2, wherein the absorbent element is an opaque light trap located so as to interrupt part of the beam of emitted light.

5. A system according to claim 2, wherein the absorbent element is an opaque plate having at least one through hole for passage of the emitted light therethrough.

6. A system according to claim 5, wherein the absorbent element is a diaphragm.

7. A system according to claim 5, wherein the absorbent element defines a multiplicity of small through holes.

8. A system according to claim 7, wherein the absorbent element is in the form of a grid.

9. A system according to claim 2, wherein the running light is of an elliptical type and the reflector defines a zone of concentration of light, the running light further including a lens defining a focus close to the zone of concentration of light, and the running light further including means mounting the absorbent element for selectively interposing the absorbent element over at least part of the emitted light beam after reflection of the light beam by the reflector.

10. A system according to claim 9, wherein the absorbent element has an external contour such that the absorbent element is interposed over the whole of the emitted light beam after reflection of the light beam by the reflector.

11. A system according to claim 9, wherein the absorbent element has an external contour such that the absorbent element is interposed over a predetermined portion of the emitted light beam after reflection of the light beam by the reflector.

12. A system according to claim 9, wherein the absorbent element is adapted to be placed selectively in a direction which is essentially transverse with respect to the light beam after reflection of the light beam by the reflector, at a distance from the zone of concentration of light.

13. A system according to claim 12, the lens having an input face, wherein the absorbent element is adapted to be placed selectively between the light concentration zone and the input face of the lens.

14. A system according to claim 9, further including pivot means mounting the absorbent element in the running light for pivoting movement between a working position in which the absorbent element is interposed on the emitted light beam, and a retracted position remote from the light beam, the system further including drive means connected with the lighting switch and the absorbent element for moving the absorbent element between the positions in response to operation of the lighting switch.

15. A system according to claim 2, wherein the reflector is itself capable of generating the emitted light beam, the system further including means mounting the absorbent element for selectively placing the absorbent element in a position in which it is interposed on at least part of the emitted light beam between the light source and the reflector.

16. A system according to claim 15 in which the lamp defines an axis and the absorbent element is disposed around the light source, wherein the system further includes a support mounting the absorbent element for displacement of the latter parallel to the axis of the lamp, and drive means connected with the lighting switch and the support for displacement of the support by the drive means in response to operation of the lighting switch.

17. A system according to claim 1, wherein the reflector is adapted to produce a lighting beam for night driving in the form of a main beam.

* * * * *